UNITED STATES PATENT OFFICE.

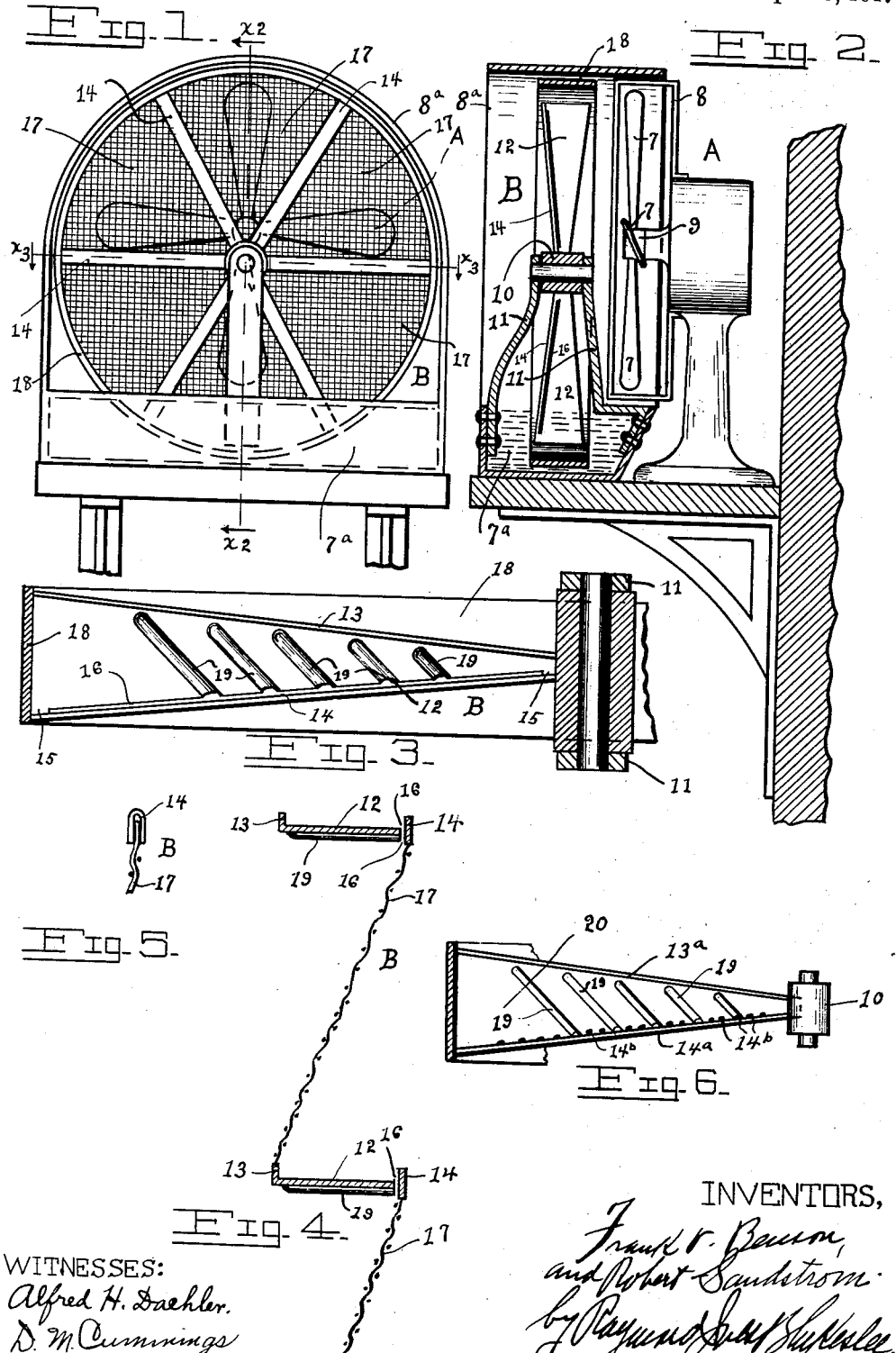

FRANK V. BENSON AND ROBERT SANDSTROM, OF LOS ANGELES, CALIFORNIA, ASSIGNORS OF ONE-FOURTH TO HARRY I. THOMPSON AND ONE-FOURTH TO N. HERMAN CEDERQUIST, BOTH OF LOS ANGELES, CALIFORNIA.

AIR AND TEMPERATURE MODIFYING MEANS.

1,240,656.   Specification of Letters Patent.   Patented Sept. 18, 1917.

Application filed May 26, 1914. Serial No. 841,072.

*To all whom it may concern:*

Be it known that we, FRANK V. BENSON and ROBERT SANDSTROM, both citizens of the United States, residing at Los Angeles, in the county of Los Angeles and State of California, have jointly invented new and useful Improvements in Air and Temperature Modifying Means, of which the following is a specification.

This invention relates to air and temperature modifying means, and particularly such means as include in embodiment an air agitator or blower or fan and means disposed in the path of the air currents produced or supplied thereby for adding moisture to the air so that the air currents are cooled and likewise rendered to a certain extent humid, thus converting hot dry air into cool moist air. In connection with such means provision may be made for otherwise or further modifying the air currents, as by perfuming the same or subjecting the same to disinfectants or other medicaments. The invention has for its object to provide air cooling and modifying means of the general nature stated which will be relatively simple and inexpensive in construction, and which will be further superior in point of positiveness in operation, low cost of operation, facility of repair and maintenance and length of life, and which will likewise be compact in form and adaptable to a wide range of service.

With the above and other objects in view, the invention consists in the novel and useful provision, formation, construction, combination, association and relative arrangement of parts, members and features, all as hereinafter described, shown in the drawing and finally pointed out in claims.

In the drawing:

Figure 1 is a front elevation of air cooling and modifying means constructed in accordance with the invention and mounted upon a suitable support;

Fig. 2 is a vertical central sectional view of the same, taken upon the line $x^2$—$x^2$, Fig. 1;

Fig. 3 is an enlarged detail transverse sectional view, taken on the line $x^3$—$x^3$, Fig. 1, and looking downwardly;

Fig. 4 is an enlarged fragmentary and partially diagrammatic view illustrating more fully certain details of construction and arrangement of features;

Fig. 5 is a fragmentary detail view, likewise upon a much enlarged scale; and

Fig. 6 is an enlarged detail view, partly in section, of a modified form of construction.

Corresponding parts in all the figures are designated by the same reference characters.

Referring with particularity to the drawing, A designates a fan, which may be electrically driven, of the ordinary type utilized extensively for cooling dwelling apartments and offices and the like, having a plurality of blades 7 by which the air is set into motion, such blades being housed in the usual squirrel cage or foraminous guard 8. The blades are radially extended from a driving hub 9. Directly in front of, or in the path of the air currents produced or supplied by the fan A, are means B for supplying liquid within the path of the air currents; said means B including a tank or container 7 which may be included within the structure of a hood or cage 8 within one end of which the fan blades 7 are disposed, so that the currents of air generated by the fan blades are confined within such hood or housing and projected through the same and subjected therein to the action or influence of the means B. Within the tank 7 may be contained pure water or water modified or treated as desired, or having such content as may be selected for entering into the action of modification of the air currents generated by the fan. For instance, perfumes or disinfectants may be added to the water or other fluid in such tank 7. A suitable hub 10 is rotatively mounted within the housing 8, as upon standards 11 rising from the walls of the tank 7; and secured thereto are a plurality of radial paddles 12 which increase in width or are transversely enlarged from their inner ends to their outer ends, and are provided each with longitudinal strips 13 and 14, of which the strips 13 are connected directly to and abut against the paddles 12; the strips 14 being slightly spaced therefrom throughout their entire length between the terminal portions of the strips 14, which portions are connected to the respective paddles, as at 15. Thus an elongated slot 16 is provided between each of the strips 14 and the adjacent edge of the respective paddle 12. Between each of the strips 14, all of which are arranged at corresponding edges of the paddles 12, and the strip 13 of the next adjacent paddle 12, (all such strips 13 being connected with corresponding sides of the respective paddles 12), extends a foraminous sheet 17, filling in all the space between such strips 13 and 14, from the hub 11 outwardly to an annular rim 18 within which all the paddles 12 are inclosed, the ends of the paddles being joined therewith. Upon one face of each of the paddles 12, namely that face which constitutes the rising side of the paddle, in the rotary motion of the paddles and their hub and the rim 18, is provided a plurality of transversely extending and slightly inwardly inclined grooves or channels 19, of varying length, such channels all being closed each at one end and opening at the other end at the respective slot 16.

Each of the strips 13 and 14 may consist of a sheet of tin or other metal folded upon itself so as to embrace one edge of the screen or perforated fabric 17, as clearly shown in Fig. 5. Likewise, each of the paddles may consist of a suitable metal sheet, as at 20 in Fig. 6, bent up at its respective edges to form the respective strips 13$^a$ and 14$^a$ with which the perforated or foraminous sheet 17 is connected, such sheet being perforated adjacent to the strip 14$^a$, as at 14$^b$, in substitution for the slot 16, suitable channels or grooves 19 being provided as desired, leading water to such perforated zone.

The operation, method of use and advantages of the improved means for cooling and modifying air will be readily understood from the foregoing description taken in connection with the accompanying drawing and the following statement:

As the fan A is operated, air currents are driven thereby through the casing or hood 8, and such air currents cause the slow rotation of the paddles 12 and connected parts, successively dipping such paddles into the fluid contents of the tank 7, the rotation being in the direction indicated by the arrow in Fig. 1. Each of the paddles elevates from the tank 7 a quantity of liquid, acting as a bucket, the liquid being pocketed on the paddle between the strips 13 and 14. When the paddle comes to horizontal position the liquid will commence to flow along the paddle toward its inner end, being directed by the grooves 19 to the slot 14, through which it passes and trickles down and over the foraminous sheet 17. The air currents from the fan take up such liquid, causing evaporation thereof, in part, which cools the air currents; and moisture is likewise added to the air currents, modifying the same and producing an appreciable humidity which, combined with the coolness produced, converts the warm dry air into cool moist air, the effect of which is pleasing and salutary. The screens or sheets 17 are thus successively moistened, and successively impart their moisture to the air currents, part of such moisture being, as stated, evaporated to produce a quick cooling of the air currents.

The operation will be similar with respect to the modified form of construction indicated in Fig. 6, water passing through the perforations 14$^b$ on to the proper foraminous sheet 17. The apparatus operates economically, with respect to utilization of the fluid contents of the tank 7, and likewise effectively to cool and modify the air currents, all in accordance with the nature of the contents of the tank 7; and the apparatus will automatically operate, without attention, for the purposes stated, for long periods of time.

It is manifest that many variations may be made with respect to the specific construction and combination and inter-relation of parts, members and features herein shown and described, without departing from the spirit of the invention and a fair interpretation thereof.

Having thus described our invention, we claim and desire to secure by Letters Patent:

1. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets athwart the air currents and permeable to air, said surfaces extending each unbrokenly between the respective buckets with which it is connected and causing rotation of said rotative means by impingement of air currents thereon.

2. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets athwart the air currents and permeable to air; said surfaces extending each diagonally between the respective buckets with which it is connected and causing rotation of said rotative means by impingement of air currents thereon.

3. Air and temperature modifying means, comprising means for providing air in motion, rotative means disposed in the path of such moving air which is directed axially of said rotative means, and a liquid container which said rotative means enters in part during rotation; said rotative means comprising a plurality of buckets, and liquid-conducting surfaces extending between said buckets and permeable to air; all of said buckets being perforated at the sides thereof next adjacent to said surfaces.

4. Air and temperature modifying means, comprising means for providing air in motion, rotative means disposed in the path of such moving air which is directed axially of said rotative means, and a liquid container which said rotative means enters in part during rotation; said rotative means comprising a plurality of buckets, and liquid-conducting surfaces extending between said buckets and permeable to air; all of said buckets being perforated at the sides thereof next adjacent to said surfaces, and each of said buckets being likewise provided with a channel directing liquid toward such perforated bucket portion.

5. Air and temperature modifying means, comprising means for providing air in motion, rotative means disposed in the path of such moving air, and a liquid container which said rotative means enters in part during rotation; said rotative means comprising a plurality of radial buckets, and liquid-conducting surfaces extending between said buckets and in the plane of all the buckets and permeable to air; all of said buckets being perforated at the sides thereof next adjacent to said surfaces, and each of said buckets being likewise provided with a diagonal channel directing liquid toward such perforated bucket portion.

6. Air and temperature modifying means, comprising means for providing air in motion, rotative means disposed in the path of such moving air, and a liquid container which said rotative means enters in part during rotation; said rotative means comprising a plurality of radial buckets, and liquid-conducting surfaces extending between said buckets and in the plane of all the buckets and permeable to air; all of said buckets being perforated at the sides thereof next adjacent to said surfaces, and each of said buckets being likewise provided with a plurality of channels directing liquid toward such perforated bucket portion.

7. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets and permeable to air; said surfaces extending each unbrokenly between the respective buckets with which it is connected; each of said buckets having longitudinal side strips one of which is slightly spaced throughout the major portion of its length from the edge portion of the respective bucket; and each of said surfaces extending between one of said spaced side strips on one bucket and another side strip on the next adjacent bucket.

8. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets and permeable to air; said surfaces extending each unbrokenly between the respective buckets with which it is connected; each of said buckets having longitudinal side strips one of which is slightly spaced throughout the major portion of its length from the edge portion of the respective bucket; each of said surfaces consisting of a foraminous sheet.

9. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets and permeable to air; said surfaces extending each unbrokenly between the respective buckets with which it is connected and in the plane of all said buckets; there being a rim provided for said buckets and inclosing the end portions thereof.

10. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets and in the plane of all of said buckets and permeable to air; said surfaces extending each unbrokenly between the respective buckets with which it is connected; a hood being provided and surrounding the entirety.

11. Air and temperature modifying means, comprising means for providing air in motion, rotative means disposed in the path of such moving air, and a liquid container which said rotative means enters in part during rotation; said rotative means comprising a plurality of buckets, and liquid-conducting surfaces extending between said buckets and permeable to air; said buckets being perforated at the sides thereof next adjacent to said surfaces, and each of said buckets being likewise provided with a plurality of channels directing liquid toward such perforated bucket portion; said rotative means being propelled by re-action of the moving air against its under surface.

In testimony whereof, we have signed our names to this specification in the presence of two subscribing witnesses.

FRANK V. BENSON.
ROBERT SANDSTROM.

Witnesses:
ALFRED H. DAEHLES,
TYCIE FULLEN.